(12) United States Patent
Zhao

(10) Patent No.: US 10,387,840 B2
(45) Date of Patent: Aug. 20, 2019

(54) MODEL GENERATOR FOR HISTORICAL HIRING PATTERNS

(71) Applicant: Microsoft Technology Licensing, LLC, Redmond, WA (US)

(72) Inventor: Dacheng Zhao, Sacramento, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 14/815,788

(22) Filed: Jul. 31, 2015

(65) Prior Publication Data

US 2017/0032326 A1 Feb. 2, 2017

(51) Int. Cl.
| | |
|---|---|
| *G06Q 10/10* | (2012.01) |
| *G06Q 10/06* | (2012.01) |
| *G06Q 30/08* | (2012.01) |
| *G06Q 30/02* | (2012.01) |
| *G06Q 10/00* | (2012.01) |
| *G06Q 50/00* | (2012.01) |

(52) U.S. Cl.
CPC ....... *G06Q 10/1053* (2013.01); *G06Q 10/105* (2013.01); *G06Q 50/01* (2013.01)

(58) Field of Classification Search
CPC ... G06Q 10/1053; G06Q 10/105; G06Q 50/01
USPC .................................. 705/1.1–912
See application file for complete search history.

(56) References Cited

U.S. PATENT DOCUMENTS

| | | | | |
|---|---|---|---|---|
| 2010/0324970 | A1* | 12/2010 | Phelon ............ | G06F 17/30867 705/321 |
| 2014/0074738 | A1* | 3/2014 | Thankappan ...... | G06Q 10/1053 705/321 |
| 2014/0180756 | A1* | 6/2014 | Hankin ............. | G06Q 10/0635 705/7.28 |
| 2015/0112881 | A1* | 4/2015 | Modugu ............ | G06Q 10/1053 705/321 |
| 2015/0127565 | A1* | 5/2015 | Chevalier .......... | G06Q 10/00 705/319 |
| 2016/0232540 | A1* | 8/2016 | Gao ................... | G06Q 30/0201 |

\* cited by examiner

*Primary Examiner* — Jonathan P Ouellette
(74) *Attorney, Agent, or Firm* — Schwegman Lundberg & Woessner, P.A.

(57) ABSTRACT

Method of providing a member of a social network system with information pertaining to a set of job openings available to the member. The set of job openings are generated by accessing a member profile comprising a set of member characteristics and identifying a set of career paths. The method is further performed by generating a first a first set of job openings from a plurality of job listings based on the set of career paths. A second set of job openings is generated from the first set of job openings by processing the set of member characteristics using a historical hiring model. Information pertaining to the second set of job openings is communicated to a client device accessing the social networking system.

20 Claims, 9 Drawing Sheets

MODEL GENERATOR FOR HISTORICAL HIRING PATTERNS

TECHNICAL FIELD

The present disclosure generally relates to the technical field of social-networking systems and, in one embodiment, to analyzing a vast array of information maintained by a social network with respect to careers of members of the social network and determining hiring proclivities of hiring entities to tailor personalized sets of job opening listings.

BACKGROUND

A social network system, such as LinkedIn, may allow members to declare information about themselves, such as their professional qualifications or skills. In addition to information the members declare about themselves, a social network system may gather and track information pertaining to behaviors of members with respect to the social network system and social networks of members of the social network system. Analyzing a vast array of such information may help to come up with solutions to various problems that may not otherwise have clear solutions.

DESCRIPTION OF THE DRAWINGS

Some embodiments are illustrated by way of example and not limitation in the accompanying drawings, in which.

DETAILED DESCRIPTION

Figure 1:
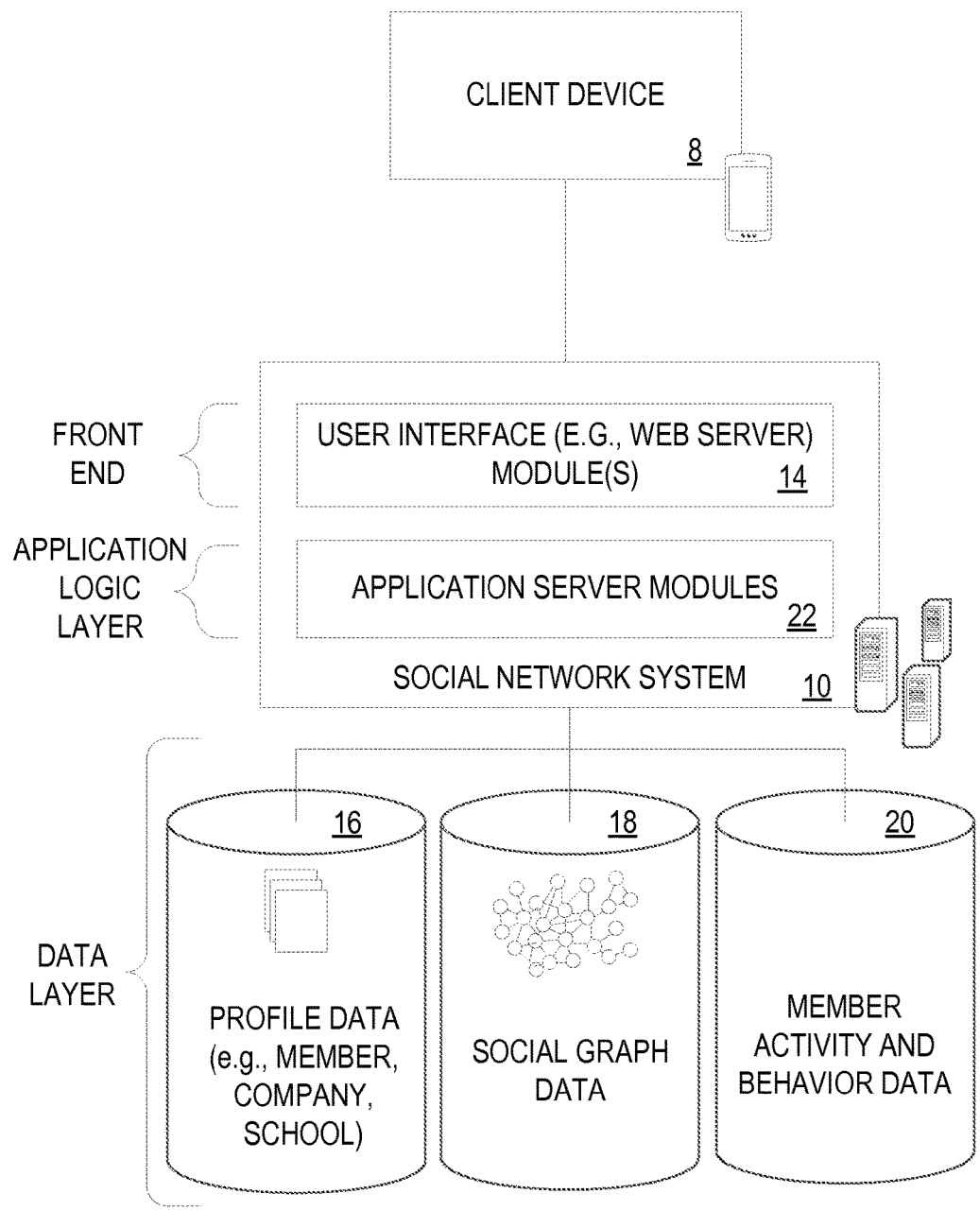
FIG. 1 is a block diagram of the functional modules or components that comprise a computer-network based social network service, including application server modules consistent with some embodiments of the invention.

The present disclosure describes methods, systems and computer program products for providing a member of a social network system with information pertaining to a set of job openings that may be available to the member. The system may incorporate the output of a career path model into a historical hiring model to generate the set of job openings. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

A member of a social networking system may seek to apply to jobs only for which the member is qualified and stands a reasonable chance of obtaining. However, even when hiring for specific jobs having predetermined qualifications associated with that particular job, hiring entities (e.g., hiring managers, human resources staff, and recruiters) may have latent proclivities or biases in their hiring patterns and practices. These proclivities may manifest themselves in explicit signals and implicit signals. For example, explicit signals may include endorsements of a member of a social networking system, forming a connection to a member of the social networking system hired by the hiring entity, or other direct indications of favor. Implicit signals may include a dense shared network within the social networking system, similarity of job titles aside from seniority, hiring candidates with common experience, skills, educational backgrounds, hobbies, credentials, and other characteristics among individuals hired by a given hiring entity within a company. In some instances these common characteristics exist outside of the qualifications associated with a particular job for which the individual is being hired. Further, in some instances, certain of these common characteristics extend among individuals hired for disparate positions and having disparate qualifications relating to the job for which that individual was hired. These proclivities and biases of hiring entities may affect the likelihood of a member (e.g., a candidate for a job opening) being hired for a job. Further, the member applying for the job opening often has no indication of these proclivities and biases prior to submitting their resume.

A social networking system may have a vast array of information pertaining to other members, companies at which members have been hired or are currently employed, and entities responsible, as least in part, for deciding whether to hire members of the social networking system. As will be discussed in more detail below, information pertaining to members of the social networking system can include data items pertaining to education, work experience, skills, reputation, certifications, or other qualifications of each of the members of the social networking system and at particular points during the careers of these members. An analysis of this information may expose the hiring proclivities and biases of hiring entities which the member or even the hiring entity may not be aware. For example, an analysis of the information may show a given hiring entity more often hires individuals from a particular university or company, or having a particular skill unrelated to job functions for which individuals are being hired (e.g., language proficiencies, time living abroad, hobbies, interests). Additionally, the information may show differing proclivities of hiring entities in relation to one another, such as lateral relationships and hierarchical relationships. Analysis of this information may provide the member with a likelihood or relative likelihood of being interviewed or hired for a particular job, based on the hiring entity. Further, this analysis may inform the member's decision to initially apply to the particular job.

In various embodiments, a system analyzes vast amounts of data representing careers, qualifications, skills, experience, education, hobbies, interests, and other characteristics of members of the social networking system to identify jobs for which a given member may be a good fit. For example, an individual can search job openings on the social networking system, or a system accessed by the social networking system, and be provided with a listing of jobs or an order to a listing of jobs indicating a good fit or relative fit which considers the hiring proclivities of the relevant hiring entities associated with the jobs. In some instances, the determination of a fit of the member with a job is based on a combination of a determined or modeled career path for the member and one or more determined or modeled hiring proclivities of hiring entities responsible or otherwise associated with a job opening. In various other embodiments, the system analyzes the data representing the members of the social networking system to identify candidates for a job based on a combination of the characteristics associated with the members and the hiring proclivities of the hiring entity associated with the job. For example, the social networking system can provide a recruiter or a member of the hiring entity (e.g., a human resources worker, hiring manager) a set of candidates (e.g., members of the social networking system) qualified for a specific job opening based on the career paths of the candidates and the hiring proclivities of the recruiter or hiring entity.

In various embodiments, a historical hiring model is configured to identify proclivities and biases of hiring entities based on job postings listed for a company and member characteristics available to the social networking system for members hired for jobs represented by the job postings. In some instances the historical hiring model determines hiring proclivities among individuals within a hiring entity (e.g., members of a human resources team) associated with specific job postings and for the hiring entity as a whole based on the proclivities of the individuals in the hiring entity and a relation determined among the individuals. In various embodiments, the historical hiring model is configured to modify a set of members of the social networking system for a hiring entity or to modify a set of job openings for a member of the social networking system. The set of job openings or members may be initially generated using a career path model and then modified using the historical hiring model. In some instances, modification of the set of job openings or members reorders the set of job openings or members. In some instances, modification of the set of job openings or members incorporates additional job openings or members into the initial listing along with or in place of reordering.

In performing its functions for identifying proclivities and biases of hiring entities, the historical hiring model, alone or in combination with other components disclosed herein, identifies each hiring entity and the members of the social networking system that each hiring entity most likely hired. In some instances the historical hiring model uses explicit signals and implicit signals to identify members likely hired by an individual hiring entity. The historical hiring model then mines member data for the identified hired members for explicit and implicit similarities among the hires. Explicit signals may include endorsements of a member of a social networking system, forming a connection to a member of the social networking system hired by the hiring entity, or other direct indications of favor. Implicit signals may include a dense shared network within the social networking system, similarity of job titles aside from seniority, hiring candidates with common experience, skills, educational backgrounds, hobbies, credentials, and other characteristics among individuals hired by a given hiring entity within a company. In some instances, the historical hiring model then strips out or otherwise removes from consideration characteristics associated with the explicit or implicit similarities which are driven by explicit needs of the role for which the member was hired or the general proclivities identified for the company. The remaining explicit and implicit similarities may function as a signature for each hiring entity identifying the proclivities of that hiring entity. These remaining explicit and implicit similarities may then be used by the historical hiring model to refine and improve the set of job openings shown to members seeking employment and a set of members identified for recruiters or the hiring entity when performing searches seeking candidates for a specific job listing.

In various embodiments, a method of identifying and communicating job openings for presentation to a client device accessing the social networking system is disclosed. A set of search parameters may be received. The social networking system accesses a member profile and identifies a set of career paths for the member. The social networking system may then generate or identify a first set of job openings from a plurality of job openings. Using the historical hiring model, the social networking system may generate a second set of job openings from the first set of job openings, and in some embodiments the plurality of job openings. The social networking system then communicates information pertaining to the second set of job openings for presentation at a client device accessing the social networking system.

In various embodiments, a method of identifying and communicating a set of member profiles to a client device accessing the social networking system is disclosed. The social networking system may receive search parameters for member characteristics of the plurality of members of the social networking system. The social networking system then accesses member profiles for members of the social networking system. The social networking system generates a set of career paths for the members and determines those members initially qualified for review for a predetermined job opening to generate or identify a set of members (e.g., a list of qualified members). The social networking system generates a second set of members using the historical hiring model for the hiring entity associated with the predetermined job opening and communicates information pertaining to the second set of members for presentation at a client device accessing the social networking system.

In various embodiments, a career path includes a primary career path and multiple sub-career paths, such as progression from one career path to another. A particular sub-career path may be identified as leading to additional sub-career paths. Together, the sub-career paths may form a career path, even though the sub-career paths are associated with careers that are traditionally considered separate.

Other advantages and aspects of the present inventive subject matter will be readily apparent from the description of the figures that follow.

FIG. 1 is a block diagram of the functional modules or components that comprise a computer- or network-based social network service 10 consistent with some embodiments of the invention. As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

Figure 2:
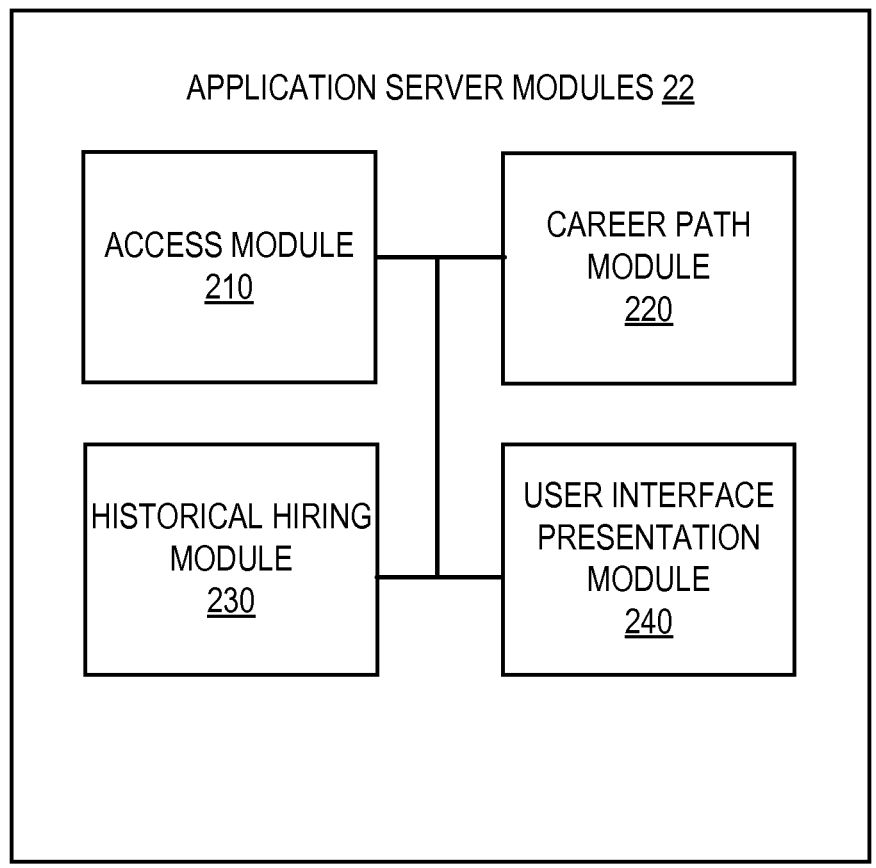
FIG. 2 is a block diagram depicting some example application server modules of FIG. 1.

FIG. 2 is a block diagram depicting some example application server modules 22 of FIG. 1. The application server modules 22 may include an access module 210, a career path module 220, a historical hiring module 230, and a user interface presentation module 240.

The access module 210 may be configured to access a member profile and collect member profile data from one or more databases or other data storage devices. In addition to the member profile data, the access module 210 may collect behavior data and social network data, as described in more detail below.

The career path module 220 may be configured to make inferences about professional qualifications of members and identify one or more career paths for members of the social networking system. The inferences may be based on an application of a Hidden Markov Model (HMM) or various algorithms described in more detail below. The career paths may be identified based on a comparison between data corresponding to a member and data corresponding to other members who were similarly situated to the member at a previous time. In various example embodiments, the career path module 220 calculates probabilities that a member will follow each of the identified career paths based on career path scores, the HMM, a comparison algorithm, and other data or algorithms, as described in more detail below. Based on the inferences and calculated probabilities, the career path module 220 generates or identifies a first set of job openings or a first set of members.

The historical hiring module 230 may be configured to generate a second set of job openings or second set of members based in part on the first set of job openings or the first set of members. The historical hiring module 230 generates weight elements for one or more of the member characteristics of the member, hiring entities within a company associated with a job opening, or a company associated with a job opening. In various embodiments, the historical hiring module generates the second set of job openings or second set of members by reordering the first set of job openings or first set of members using the weight elements. In other embodiments, the historical hiring module generates the second sets by identifying additional job openings or members not identified by the career path module 220.

The user interface presentation module 240 may be configured to generate a user interface for presentation at a client device accessing the social networking system. The user interface may include information pertaining to identified job openings, identified members, a fit score or weight element for each job opening or identified member, and identified career paths and probabilities corresponding to the career paths. In various embodiments, the fit score or weight element represents a probability of being interviewed for the identified job openings.

Figure 3:
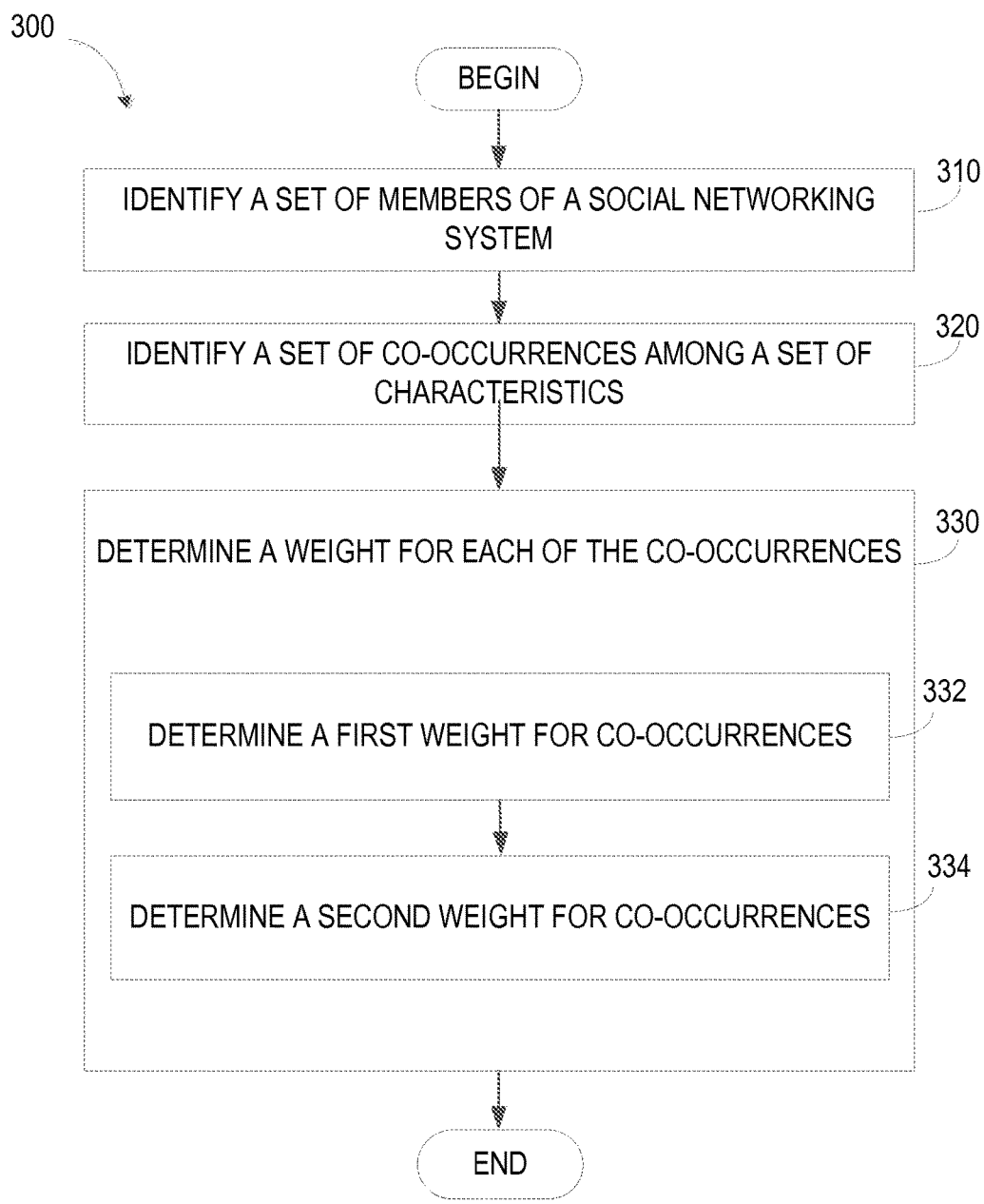
FIG. 3 is a flow diagram illustrating an example method of generating a historical hiring model

FIG. 3 is a flow diagram illustrating an example method 300 for generating a historical hiring model for a company or hiring entity within a company using the historical hiring module 230. The historical hiring module 230 may comprise one or more historical hiring models for each company. In various embodiments, where a company has a single entity or individual making hiring decisions, the historical hiring model for the company and the hiring entity may be the same historical hiring model. In instances where a company has a plurality of hiring entities, such as a set of human resources personnel with individual hiring authority, the historical hiring module 230 generates a historical hiring model for each of the plurality of hiring entities. In some cases, in addition to the historical hiring models for the plurality of hiring entities, the historical hiring module 230 generates a historical hiring model for the company.

In operation 310, the historical hiring module 230 identifies a set of members of the social networking system hired by a company. The historical hiring module 230 may identify the set of members by causing the access module 210 to access one or more member profiles associated with the company, the company profile, a company website, publicly available information, or any other data source accessible by the social networking system. In some embodiments, as the access module 210 retrieves the member profiles and other information, the historical hiring module 230 determines the existence of data indicative of present employment or prior employment of a member by the company. For example, when retrieving member profiles of the social networking system, the historical hiring module 230 determines company identifying information within an employment history of a member profile. The historical hiring module 230 then determines whether one or more of the company identifying information matches an identification of the company.

In operation 320, the historical hiring module 230 identifies a set of co-occurrences among a set of characteristics of the set of members hired by the company. Once a set of members employed or previously employed by the company have been identified, the historical hiring module 230 accesses additional member data representative of each member of the set of members. The additional member data for each member comprises a set of characteristics representative of each member's personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information may be collectively stored as the member's profile information within the social networking system. The historical hiring module 230 determines occurrences of individual characteristics of among the set of members employed or previously employed by the company. Further, the historical hiring module 230 determines co-occurrences among pairs or pluralities of characteristics. For example, the historical hiring module 230 may determine that a characteristic of proficiency in the Java programming language co-occurs in member profiles along with a characteristic of proficiency in the C++ programming language. The historical hiring module 230 may then determine the frequency at which the co-occurrence appears among the set of members. Further, the historical hiring module 230 may determine the frequency at which a given co-occurrence appears within subsets of the set of members, such as subsets associated with differing levels of employment, duties, or employment positions.

In operation 330, the historical hiring module 230 determines a weight for each of the co-occurrences. Based on the frequency of co-occurrence of characteristics among the set of members and among subsets of the set of members, the historical hiring module 230 may generate a weight for each of the co-occurrences or each of the individual characteristics.

As shown in FIG. 3, the operation 330 may include one or more sub-operations. In operation 332, the historical hiring module 230 determines a first weight for co-occurrences among the set of member characteristics associated with members employed in filled job postings determined to share similar qualifications. The first weight may represent both co-occurrences of characteristics (e.g., skills and qualifications) relating to jobs and co-occurrences of characteristics unrelated to the jobs. The first weight may also be indicative of a hiring proclivity or bias in a company or among hiring entities related to a single position or related positions. For example, the first weight may indicate a preference for programmers from Stanford over another university.

In operation 334, the historical hiring module 230 determines a second weight for co-occurrences among the set of member characteristics associated with members employed in filled job postings determined to have disparate qualifications. The second weight for co-occurrences may be indicative of hiring proclivities or bias in a company or among hiring entities for positions across the company. For example, the second weight may indicate a sporting goods or outdoors store has a hiring proclivity for individuals whose hobbies include mountain biking and hiking, regardless of position within the company.

The first weight, indicating a proclivity for a specific job, and the second weight, indicating a general hiring proclivity, may be used by the historical hiring model to apply a weight to co-occurrences of skills and characteristics when determining whether a member is likely to obtain an interview for a particular position while searching job openings or whether a member should be contacted by a recruiter searching for candidates for a particular job opening. The first weight, indicative of a proclivity in hiring for the job being sought, may be weighted heavier than the second weight, being a general hiring proclivity. For example, where the member has a skill of C++ programming, which is a co-occurrence weighted with the first weight but not the second weight, the first weight may be applied as the weight for that co-occurrence for the member. Where the member has a characteristic of a set of rapid promotions (e.g., promotions at eighteen month intervals for a period of years) which is a co-occurrence in the historical hiring model weighted by the first weight and the second weight, the historical hiring model may apply a combination of the first weight and the second weight (e.g., the sum or the average). Application of the first weight or the combination of first weight and second weight may cause a job opening to be placed higher in a result set. Application of the second weight alone may cause a job opening to be placed lower in a result set, but maintain its position on the list of job openings. As such, the second weight may be additive with the first weight, indicating a higher priority for a particular co-occurrence, and may act alone as an indicator of general suitability of a member for a particular company.

Figure 4:
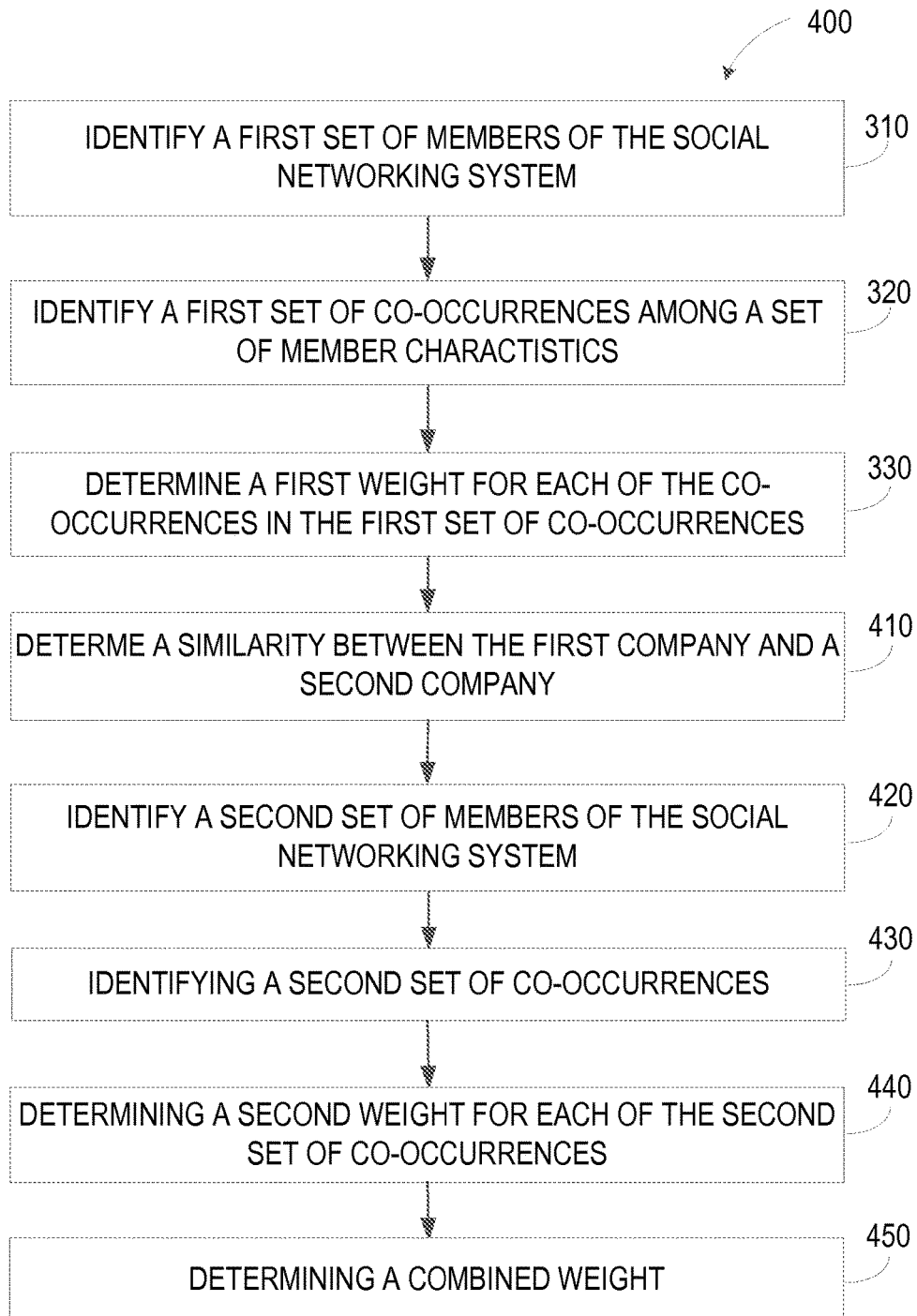
FIG. 4 is a flow diagram illustrating an example method of generating and communicating information pertaining to a set of job openings for presentation in a user interface on a client device accessing the social networking system.

FIG. 4 is a flow diagram illustrating an example method 400 of generating a historical hiring model for a company or hiring entity within a company using the historical hiring module 230, according to various example embodiments. In various embodiments, as shown in FIG. 4, a company may have sparse information accessible by the social networking system indicative of hiring proclivities or biases of the company or hiring entities within the company. For example, a start-up company may have little to no public hiring history. By way of another example, a start-up company or one expanding into a new market, technological, or business area may have sparse public hiring history within the new area. In these embodiments, the method 400 causes the historical hiring module 230 to generate an approximation of hiring proclivities or biases based on the company's information accessible by the social networking system and company information of other comparable companies accessibly by the social networking system. The method 400 may be performed, at least in part, using one or more operations of the method 300.

In operation 310, the historical hiring module 230 identifies a first set of members of the social networking system hired by a first company. As executed in the method 400, the operation 310 may be executed in the same or substantially similar manner described above.

In operation 320, the historical hiring module 230 identifies a first set of co-occurrences among the set of member characteristics of the first set of members hired by the first company. As executed in the method 400, the operation 320 may be executed in the same or substantially similar manner described above.

In operation 330, the historical hiring module 230 determines a first weight for each of the co-occurrences of the first set of co-occurrences. As executed in the method 400, the operation 330 may be executed in the same or substantially similar manner described above.

In operation 410, the historical hiring module 230 determines a similarity between the first company and a second company. Where one or more of the company data, the member data, or the hiring and filled position data for a company is sparse or falls below a saturation threshold, the historical hiring module 230 may analyze additional companies, whose data is accessible by the social networking system, to determine one or more companies similar to the company for which the historical hiring model is being generated. In various embodiments, similarity between the first company and the second company is determined based on a plurality of factors within company information supplied to (e.g., company profile) or accessed by (e.g., company website) the social networking system. The plurality of factors may include type of business, market, geographical location, time in business, number of employees, similarities among employees, and other suitable company characteristics. The similarities among the factors may be determined by direct matching of keywords, semantic relationship among keywords, an algorithmic determination of similarity based on weighing of individual or related characteristics, identification of similarity included within either the first or second company's data, or any other suitable means. For example, the historical hiring module 230 may compare the number of employees, co-occurrence of characteristics among the employees, and positions of the employees of the first company and the second company in order to determine a similarity between the first company and the second company.

In operation 420, the historical hiring module 230 identifies a second set of members hired by the second company. In some embodiments, where the historical hiring model compares the first company and the second company based on members hired at each of the companies, the operation 420 may be performed during the operation 410. In various embodiments, where company similarity is determined without respect to the members employed by the first company and the second company, the historical hiring module 230 may identify the second set of members similarly to the identification performed in the operation 310.

In operation 430, the historical hiring module 230 identifies a second set of co-occurrences among the set of member characteristics of the second set of members hired by the second company. The operation 430 may be performed on the set of member characteristics of the second set of members in a manner similar to or the same as the operation 320.

In operation 440, the historical hiring module 230 determines a second weight for each of the second set of co-occurrences among the set of member characteristics of the second set of members. The operation 440 may be performed on the second set of co-occurrences similarly or the same as the operation 330 is performed on the first set of co-occurrences.

In operation 450, the historical hiring module 230 determines a combined weight representative of co-occurrences common among the first set of co-occurrences and the second set of co-occurrences. In various embodiments, the combined weight may represent a combination of the first weight and the second weight of a common co-occurrence. For example, where a single characteristic or co-occurrence of characteristics is found in both the first set of members of the first company and the second set of members of the second company, that single characteristic or co-occurrence may be weighted greater relative to characteristics or co-occurrences which only appear in one of the first set of members or the second set of members.

Figure 5:
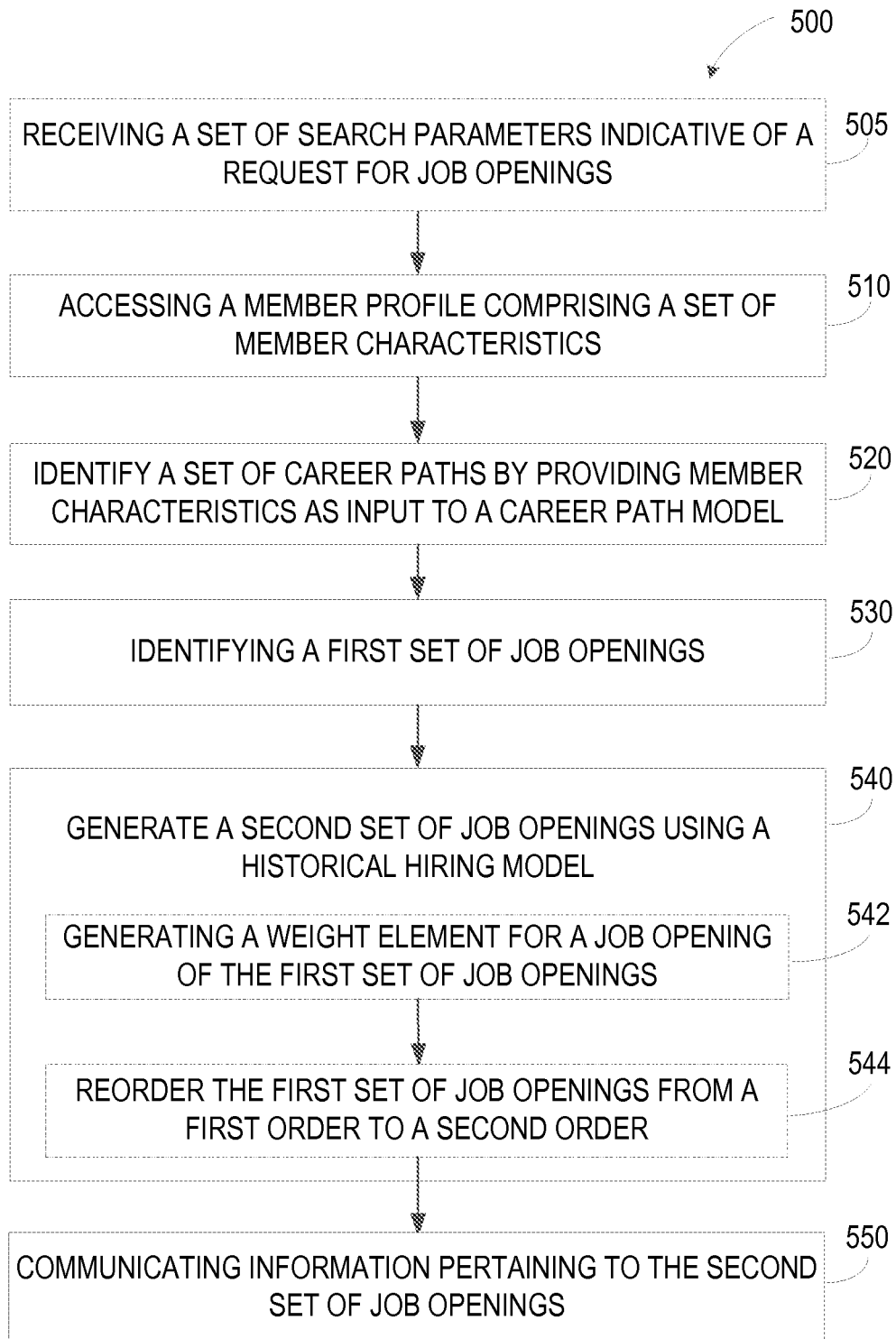
FIG. 5 is a flow diagram illustrating an example method of generating and communicating information pertaining to a set of job openings for presentation in a user interface on a client device accessing the social networking system.

FIG. 5 is a flow diagram illustrating an example method 500 of generating and communicating information pertaining to a set of job openings for presentation at an interface of a client device accessing the social networking system, according to various example embodiments.

In some embodiments, the method 500 may be initiated by an operation 505 of the access module 210 receiving a set of search parameters indicative of a request for job openings on the social networking system or accessible thereto. The set of search parameters may be received from a member of the social networking system using a client device accessing the social networking system. In some embodiments, the set of search parameters is received via a network (e.g., the internet) enabling communication between a client device and the social networking system.

At operation 510, the access module 210 accesses a member profile comprising a set of member characteristics. The member profile is associated with a member of the social networking system. In some embodiments, the access module 210 accesses the member profile by accessing one or more database (e.g., database 16 and database 20) to retrieve the data representative of the member profile as well as data indicative of member activity, behavioral data, and any other data suitable for use in determining a career path and determining characteristic co-occurrence.

At operation 520, the career path module 220 identifies a set of career paths by providing the set of member characteristics as input to a career path model. In some embodiments, the career path module 220 may determine a career goal of the member. For example, the career goal may be determined based on direct member input or indication, such as selection of a job title or desired job, a projected career path of the member based on current and previous jobs of the member, or based on a comparison between the member and other members of the social networking system having the same or similar job title, as currently held by the member, within the other members' career history. In some instances, the career path module 220 may include determinations of non-traditional career paths having similar pathing as more common career paths but having a smaller number of instances among members of the social networking system. The career path may include various milestones, including education, work experience, skills, and achievement milestones. The career path may include a progression of a person through various job-rating metrics, such as work environment (e.g., hazards, amount of public contact, confinement, or other work conditions), income or salary (e.g., growth potential based on starting salaries, mid-level salaries, and senior-level salaries), job outlook (e.g., employment growth or growth potential, unemployment rates), stress factors (e.g., amount of travel, deadlines, physical demands, hazards, competitiveness, and so on), job satisfaction, and so on. The career path module 220 may then determine other members of the social networking system who have achieved one or more milestones or ultimate goals of the career path determined for the member and identify one or more career path options of varying probabilities of occurrence.

At operation 530, the career path module 220 identifies a first set of job openings from a plurality of job openings. The identification is based on the set of career paths identified for the member. In some embodiments, the identification is based on one or more of intermittent career milestones (e.g., feeder jobs, jobs having promotion potential within the career path), the goal job position of the career path, or the former jobs and career milestones of other members having been similarly situated to the member in the past. Each job opening of the first set of job openings is associated with a company of the set of companies. The first set of job openings may be identified by matching keywords or semantic relationships within the title or job description, matching or determining similarity among a job identification code, or other suitable identification means. After identifying the first set of job openings, the career path module 220 may pass the first set of job openings or data representative thereof to the historical hiring module 230. In some embodiments, the career path module 220 provides the first set of job openings to the historical hiring module 230 in a first order. The first order may be based on a probability determination of attaining the job from a current position of the member along one of the career paths, based on relevance to the search, based on a geographical location, based on a priority selection of the member, or based on any other suitable organizational means.

At operation 540, the historical hiring module 230 generates a second set of job openings, at least in part, from the first set of job openings. The second set of job openings generated by processing the set of member characteristics using a historical hiring model for each company associated with a job opening of the first set of job openings and one or more of the company or a hiring entity within the company. In various example embodiments, each historical hiring model may be generated and fitted similarly to or the same as the hiring model generated by the one or more of the methods 300 and 400.

In various example embodiments, the operation 540 may include sub-operations. As shown in FIG. 5, in operation 542 the historical hiring model for each company generates a weight element for a job opening of the first set of job openings with which the company is associated. The weight element indicates a co-occurrence of characteristics of the member and members previously hired by the company to fill a position. In some embodiments, as explained below in more detail, the weight element may be based on co-occurrence of characteristics of the member and members currently or previously in a position determined to be similar to the position to be displayed to the member. Here, co-occurrences of characteristics which match job qualifications listed in a description or requirements list for the job opening may be afforded less weight relative to co-occurrences where at least one of the characteristics included in the co-occurrence is not listed in the description or requirements of the job opening. In some instances, as explained in more detail below, the weight element may be based on co-occurrences of characteristics of the member and members currently or previously employed by the company regardless of position. In either event, the weight may be based, at least in part, on the frequency of co-occurrence of characteristics for members currently or previously employed with the company. In some instances, a frequency of co-occurrence of a characteristic or set of characteristics may be provided a higher weight relative to other co-occurrences where the frequency is identified as higher among members currently employed with the company as opposed to members previously employed with the company.

In operation 544, the historical hiring module 230 reorders the first set of job openings from a first order to a second order. The reordering is based on the weight elements generated by the historical hiring model for each company being applied the job opening for which the weight element was generated. For example, the first set of job openings may be reordered into the second set of job openings based solely on the weight elements, without regard to the first order generated by the career path module 220. In some instances, the first set of job openings may be reordered based on a combination of the first order and the weight elements. For example, a placement of two adjacent job openings within the first order may be transposed based on one of the two adjacent job openings having a higher weight element relative to the other adjacent job opening. In some embodiments, additional algorithms may be used to impose greater adjustment to the first order to create the second order and or to focus the second order. In at least some embodiments, the historical hiring module 230 determines the second order in an attempt to place job openings toward a more prominent position (e.g., top) of the order based on a higher probability of the job opening being within the career path of the member and the hiring proclivity of the hiring entity indicating a relative higher likelihood of receiving an interview or the job based on the co-occurrence of characteristics.

In various embodiments, in addition to reordering the first set of job openings from the first order to the second order, the second set of job openings is generated by processing the set of member characteristics using the historical hiring model for each company associated with a job opening and excluded from the first set of job openings. In these embodiments, the historical hiring model, similar to the manner discussed above and below, identifies co-occurrences and frequencies of co-occurrences of member characteristics for the member with the plurality of job openings. As discussed above, the historical hiring model may determine occurrences and co-occurrences of member characteristics of the member within other members of the social networking system identified as employed or formerly employed by companies associated with job listings of the plurality of job listings which were excluded from the first set of job listings by the career path model. One or more additional job listings may be selected based on weights generated based on the occurrence and co-occurrence of member characteristics and included within the second set of job openings and within the second order.

At operation 550, the user interface presentation module 240 communicates information pertaining to the second set of job openings for presentation at a user interface of a client device accessing the social networking system. The user interface presentation module 240 may receive the second set of job openings from the historical hiring module 230 and generate one or more user interface elements indicative of the second set of job openings. For example, the user interface presentation module 240 may populate a list of links to the job openings, in the second order, with description of the job opening pulled from the posting for that job. In some instances, the user interface presentation module 240 may generate one or more enrichment indicators along with the user interface elements representative of the job openings. For example, enrichment indicators may include a representation (e.g., a graph, list, timeline) indicating the placement of a job opening on a career path of the member. In some instances, the enrichment indicator indicates a likelihood indicator (e.g., percentage, graph) indicative of a probability of obtaining an interview for the job or obtaining the job. In some instances, the enrichment indicator includes a co-occurrence indication (e.g., a percentage, a Venn diagram, a graph) representative of a number or frequency of co-occurrences of characteristics of the member identified by the historical hiring module 230. Additionally, in some instances the enrichment indicator includes which characteristics have been identified as co-occurring and provide a representation (e.g., integer, percentage) of the volume or frequency of the co-occurrence. The user interface presentation module 240 may communicate the information to pertaining to the second set of job openings (e.g., the user interface elements and the enrichment indicators) to the client device via a network. In some instances the information communicated to the client device includes data representations of the user interface elements and enrichment indicators to be processed by the client device to generate representations of the user interface elements and the enrichment indicators.

Figure 6:
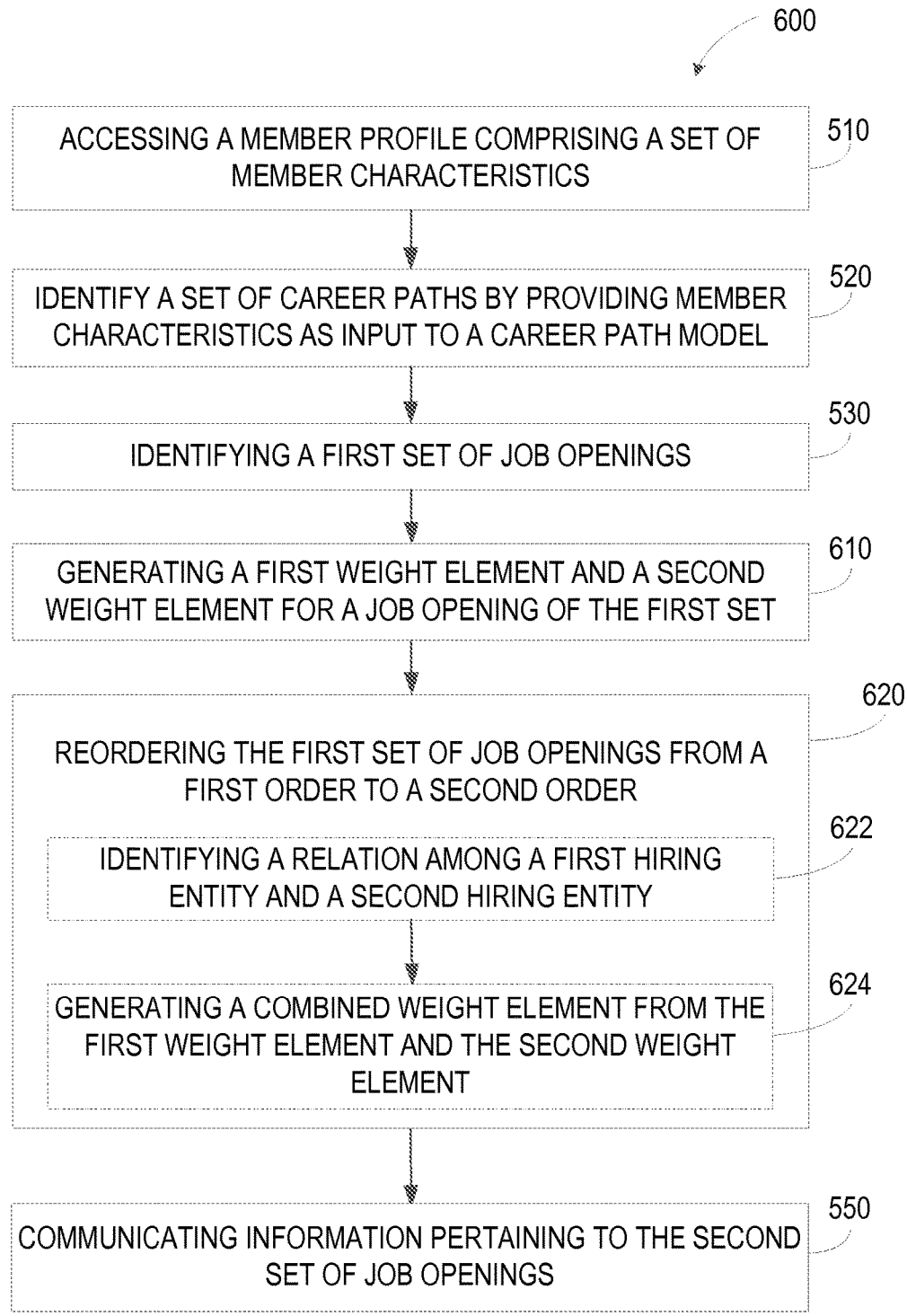
FIG. 6 is a flow diagram illustrating an example method of generating and communicating information pertaining to a set of job openings for presentation in a user interface on a client device accessing the social networking system.

FIG. 6 is a flow diagram illustrating an example method 600 of generating and communicating information pertaining to a set of job openings for presentation at an interface of a client device accessing the social networking system, according to various example embodiments. As shown in FIG. 6, and various example embodiments, the method 500 may initially be performed by operations 510-530 described above with respect to FIG. 5.

In operation 610, the historical hiring module 230 causes the historical hiring model for each company to generate a first weight element and a second weight element for a job opening of the first set of job openings with which the company is associated. The first weight element is indicative of hiring patterns (e.g., hiring proclivities, hiring biases) of a first hiring entity. The second weight element is indicative of hiring patterns of a second hiring entity within the company. The first weight element and the second weight element may be generated similarly or the same as the weight element generated by the operation 542. In some instances, as explained below in more detail, the first hiring entity and the second hiring entity may have a relationship within the company. For example, the first hiring entity and the second hiring entity may be lateral employees of the company. In some instances the first hiring entity is subordinate to the second hiring entity, such as the second hiring entity being a hiring manager in a hierarchical position above the first hiring entity.

In operation 620 the historical hiring module 230 reorders the first set of job openings from a first order to a second order based on the first weight element and the second weight element generated by the historical hiring model for each company being applied to the job opening for which the first weight element and the second weight element were generated. In some instances, the reordering of the first set of job openings may be performed similarly to the manner described with respect to the operation 544.

As shown in FIG. 6, the operation 620 may include sub-operations which may be performed by the historical hiring module 230 or other suitable module. In operation 622 the historical hiring module 230 identifies a relation among the first hiring entity and the second hiring entity. In order to identify the relation among the first hiring entity and the second hiring entity, the historical hiring module 230 initially identifies both hiring entities. For example, the historical hiring module 230 may identify the first and second hiring entities as listed contact representatives on a single job posting or on separate job postings identifying each of the hiring entities. Where the first and second hiring entities are explicitly identified (e.g., on one or more job postings), the access module 210 accesses the member profile information for the first and second hiring entities and passes the member profile information or company website information to the historical hiring module 230.

Based on the member profile information or company website information of the first and second hiring entities, the historical hiring module 230 may identify a relation among the first and second hiring entities. In some embodiments, the historical hiring module 230 identifies the relation based on explicit information (e.g., stated hierarchical relationships, managerial relationships, lateral relationships) included in the member profiles or company website. Where no information is explicitly included, the historical hiring module 230 may identify the relation among the first and second hiring entities through implicit information including time at the company, previous position title, current position title, educational background, and other information to determine an implied relation.

Where the job posting does not identify the first and second hiring entities, the historical hiring module 230 may determine the first and second hiring entities exist by analyzing the member data of the members hired at the company. The historical hiring module 230 determines first and second distinct patterns of shared characteristics or co-occurrences among members hired by the company associated with the job posting. Where one or more distinct patters (e.g., mutually exclusive co-occurrence patterns) emerge, the historical hiring module 230 may attribute each distinct pattern to a hiring entity.

In operation 624, the historical hiring module 230 generates a combined weight element from the first weight element and the second weight element. The combined weight element is generated based on a relationship among the first hiring entity and the second hiring entity. The historical hiring module 230 may generate the combined weight element to reflect relative proportions of co-occurring member characteristics among members hired which are attributable to either the first or second hiring entity. For example, where sixty percent of the co-occurring member characteristics are attributable to the first hiring entity and forty percent of the co-occurring member characteristics are attributable to the second hiring entity, the combined weight element for may reflect the sixty to forty division.

Figure 7:
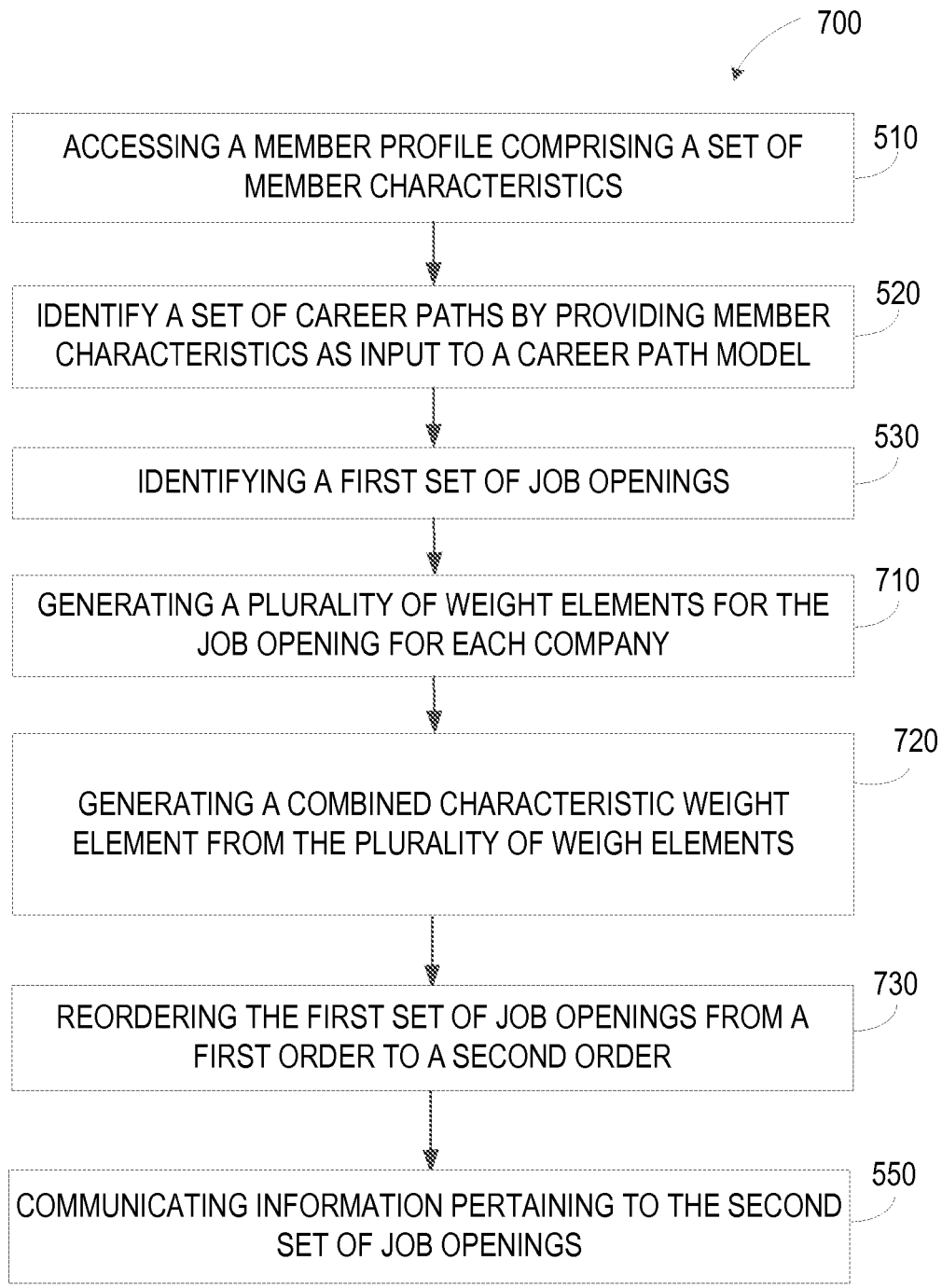
FIG. 7 is a flow diagram illustrating an example method of generating and communicating information pertaining to a set of job openings for presentation in a user interface on a client device accessing the social networking system.

FIG. 7 is a flow diagram illustrating an example method 700 of generating and communicating information pertaining to a set of job openings for presentation at an interface of a client device accessing the social networking system, according to various example embodiments. As shown in FIG. 7, and various example embodiments, the method 700 may initially be performed by operations 510-530 described above with respect to FIG. 5.

In operation 710, the historical hiring module 230 causes the historical hiring model for each company to generate a plurality of weight elements for the job opening. Each weight element of the plurality of weight elements corresponds to a characteristic of the set of member characteristics, accessed in operation 510. In some embodiments, the weight elements reflect a number of occurrences of the characteristic among members previously hired by the hiring entity. For example, where a characteristic of the member is found among all of the previously hired members, that characteristic may receive a relatively high weight, while a characteristic found in a single previously hired members may receive a relatively low weight. In some instances, the historical hiring model performs a correction or threshold process whereby the historical hiring model removes from consideration characteristics for weighting which are requirements or qualifications for the job opening. In some instances, the weight element for each characteristic is generated with respect to the conditions of the occurrence or co-occurrence of the specific characteristic. For example, where the characteristic only occurs in member characteristics of members hired in similar positions or only co-occurs with a characteristic which is a requirement of the job opening, the weight of the characteristic may be reduced, despite a relatively high frequency of occurrence or co-occurrence. In some instances, where the characteristic occurs among members in varied jobs or co-occurs with another characteristic which is not a job requirement, the weight of the characteristic may be increased.

In operation 720, the historical hiring model for each company generates a combined characteristic weight element from the plurality of weight elements. The combined characteristic weight element takes into account the varying weights of each of the individual characteristics, frequency of occurrence and co-occurrence of the characteristic, and other factors. In some embodiments, the combined characteristic weight element represents a total weight, an average weight, or other combination of the plurality of weight elements.

In operation 730, the historical hiring module 230 reorders the first set of job openings from a first order to a second order based on the combined characteristic weight elements for each job opening. The reordering may be performed similarly to reordering operations described above.

Figure 8:
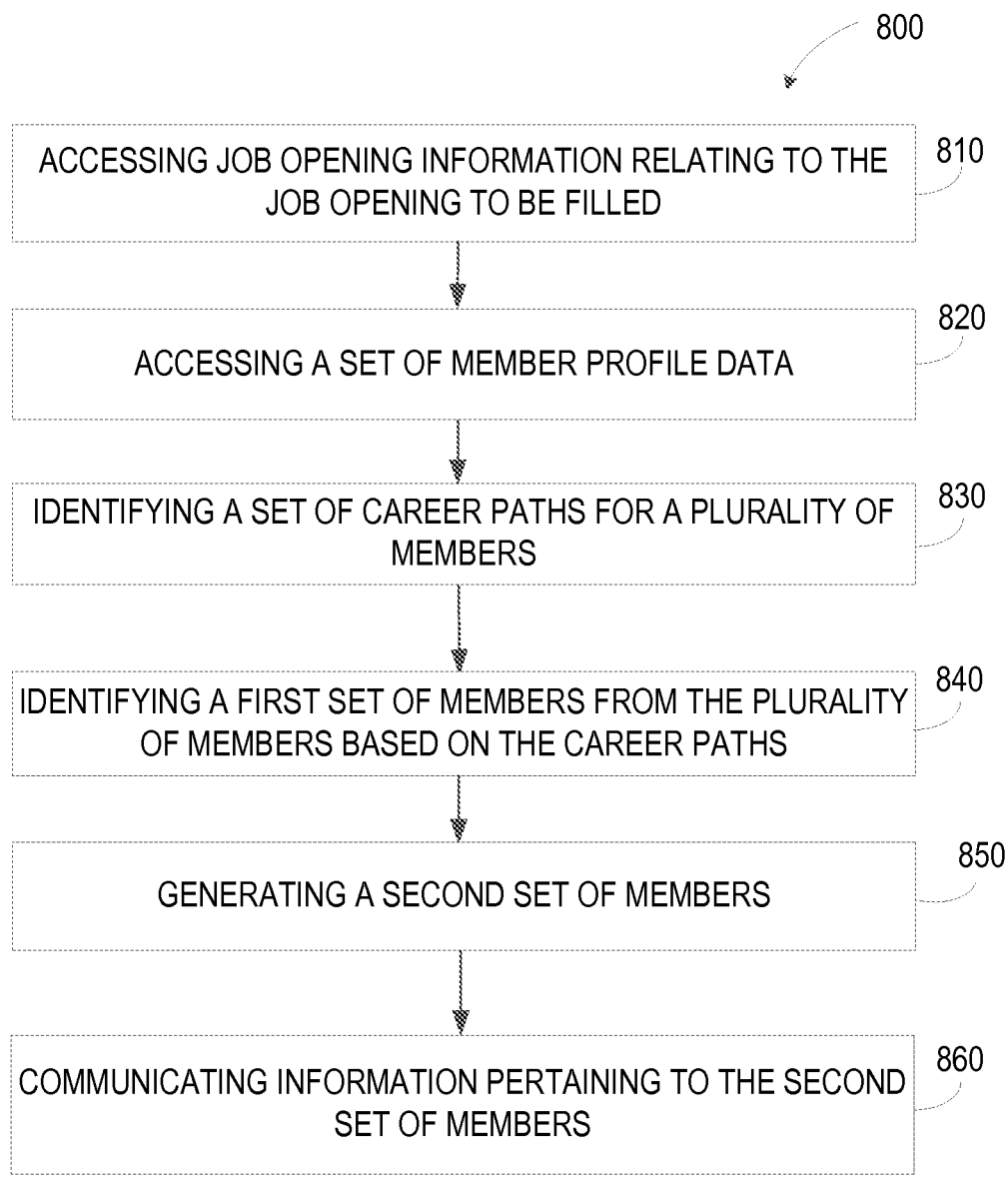
FIG. 8 is a flow diagram illustrating an example method of generating and communicating information pertaining to a set of members as candidates for a job opening for presentation in a user interface on a client device accessing the social networking system.

FIG. 8 is a flow diagram illustrating an example method 800 of generating and communicating information pertaining to a set of job openings for presentation at an interface of a client device accessing the social networking system, according to various example embodiments. As shown in FIG. 8, the method 800 is directed toward a hiring entity or recruiter obtaining a set of members suitable for a single job posting associated with a company using the historical hiring model for that company.

In operation 810, the access module 210 accesses job opening information relating to the job opening to be filled by the hiring entity or recruiter. The access module 210 may access the job opening information on one or more database (e.g., database 16 or database 20) associated with the social networking system. In some embodiments, the required qualifications for the job opening are transmitted to one or more of the career path module 220 and the historical hiring model 230.

In operation 820, based, at least in part, on the job opening information, the access module 210 accesses a set of member profile data for a plurality of members of the social networking system. The access module 210 may access the set of member profile data for the plurality of member similarly to the manner described with respect to the operation 510.

In operation 830, the career path module 220 identifies a set of career paths for the plurality of members. The career path module 220 may identify the set of career paths similar to or the same as the manner described with respect to the operation 520. In some embodiments, the career path module 220 provides a limited set of career paths, such as only direct career paths, for use in the method 800. In some instances, certain personal information is additionally scrubbed from the set of career paths or the member data used to generate the set of career paths based on sensitivity of the member data and permissions of the hiring entity or recruiter conducting a search.

In operation 840, the career path module 220 identifies a first set of members from the plurality of members based on the set of career paths. The career path module 220 determines that the first set of members meet at least the minimum qualifications for the job opening. In some situations, the first set of members are also determined as having a probable career path including the job opening. For example, the first set of members may include members having a career path goal of the job opening or a career path milestone matching the job opening.

In operation 850, the historical hiring model for one or more of the hiring entity, for another hiring entity, or for the company generates a second set of members, at least in part, from the first set of members. The second set of members generated by processing the set of member characteristics for each of the first set of members using the historical hiring model. In these embodiments, the historical hiring model may operate similarly to the historical hiring model functions described above with the exception that the historical hiring model generates a second set of members instead of a second set of job openings. The historical hiring model applies weights generated based on the co-occurrence of characteristics of the job opening and previously hired members to weight members who are identified as candidates for the job opening based on co-occurrences within the member data of each member. The historical hiring model may generate the second order based solely on the weight elements, based on co-occurrence of characteristics of members of the plurality of members excluded from the first set of members, based on a combination of the first order, generated by the career path module 220, and the and the weight elements of the historical hiring model, or any other suitable means.

In operation 860, the user interface presentation module 240 communicates information pertaining to the second set of members for presentation at a user interface of a client device accessing the social networking system. In some instances, the operation 860 may be performed similarly to the operation 550. The user interface presentation module 240 may generate a set of user interface elements representative of the members included within the second set of members. In some instances, the user interface elements are links to member profiles. In other instances, the user interface elements contain information pulled from the member profiles and contained within a user interface element presentable without linking to a member profile on the social networking system.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 9:
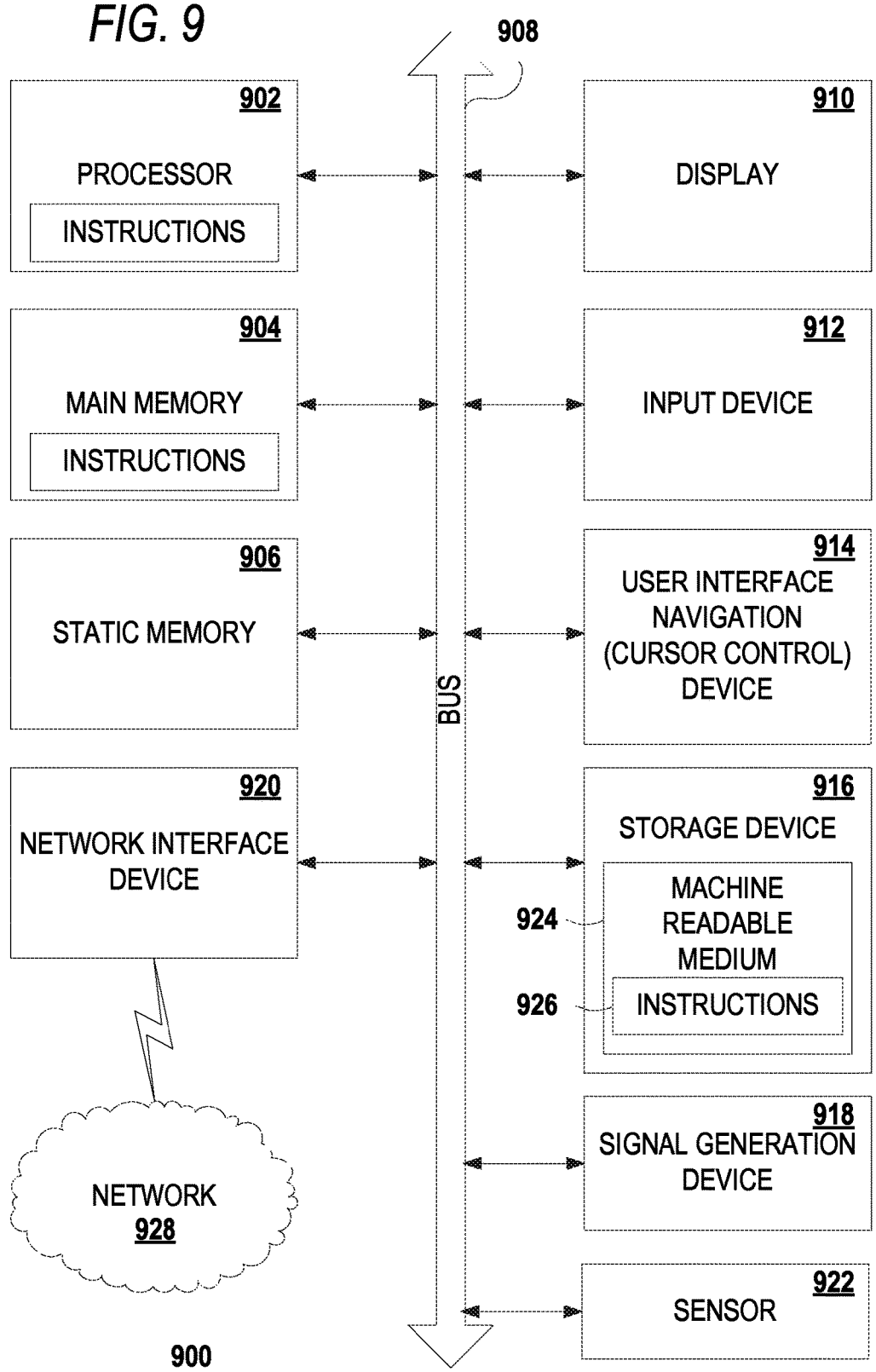
FIG. 9 is a block diagram of a machine in the form of a computing device within which a set of instructions, for causing the machine to perform any one or more of the methodologies discussed herein, may be executed.

FIG. 9 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a display unit 910, an alphanumeric input device 912 (e.g., a keyboard), and a user interface (UI) navigation device 914 (e.g., a mouse). In one embodiment, the display, input device and cursor control device are a touch screen display. The computer system 900 may additionally include a storage device 916 (e.g., drive unit), a signal generation device 918 (e.g., a speaker), a network interface device 920, and one or more sensors 922, such as a global positioning system sensor, compass, accelerometer, or other sensor.

The drive unit 916 includes a machine-readable medium 924 on which is stored one or more sets of instructions and data structures (e.g., software 926) embodying or utilized by any one or more of the methodologies or functions described herein. The software 926 (e.g. processor executable instructions) may also reside, completely or at least partially, within the main memory 904 (e.g., non-transitory machine-readable storage medium) and/or within the processor 902 during execution thereof by the computer system 900, the main memory 904 and the processor 902 also constituting machine-readable media.

While the machine-readable medium 924 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 926 may further be transmitted or received over a communications network 928 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
    accessing a member profile comprising a set of member characteristics for a member of a social networking system;
    identifying a set of career paths by providing the set of member characteristics as input to a career path model that outputs the set of career paths based on the input;
    generating, by at least one processor of a machine, a first set of job openings from a plurality of job openings based on the set of career paths, each job opening of the first set of job openings associated with a company of a set of companies;
    generating, by at least one processor of the machine, a second set of job openings from the first set of job openings, the second set of job openings generated by filtering out one or more job openings from the first set of job openings using a plurality of historical hiring models, each of the plurality of historical hiring models for a different company and the filtering comprising, for each of the one more job openings from the first set of job openings:
        processing the set of member characteristics using a historical hiring model from the plurality of historical hiring models created for a company associated with the job opening, the processing resulting in an output, and
        determining whether to filter out the job opening based on the output; and
    wherein each historical hiring model from the plurality of historical hiring models is formed by:
        using explicit and implicit signals to identify members likely hired in the past by a corresponding company for which the model is created;
        mining member data for the identified members likely hired by the corresponding company in the past to identify similarities among the identified members likely hired by the corresponding company;
        removing one or more identified similarities from consideration that are driven by explicit needs for the job opening; and
        training the historical hiring model using features other than the one or more identified similarities removed from consideration; and
    communicating information pertaining to the second set of job openings for presentation to a client device accessing the social networking system.

2. The method of claim 1 further comprising:
    receiving a set of search parameters indicative of a request for job openings on the social networking system, from a member of the social networking system.

3. The method of claim 1, wherein the historical hiring model for each company generates a weight element for a job opening of the first set of job openings with which the company is associated.

4. The method of claim 3, wherein generating the second set of job openings further comprises:
    reordering the first set of job openings from a first order to a second order based on the weight elements generated by the historical hiring model for each company being applied to the job opening for which the weight element was generated.

5. The method of claim 1, wherein the historical hiring model for each company generates a first weight element and a second weight element for a job opening of the first set of job openings with which the company is associated, the first weight element being indicative of hiring patterns of a first hiring entity within the company, the second weight element being indicative of hiring patterns of a second hiring entity within the company.

6. The method of claim 5, wherein generating the second set of job openings further comprises:
reordering the first set of job openings from a first order to a second order based on the first weight elements and the second weight elements generated by the historical hiring model for each company being applied to the job opening for which the first weight element and the second weigh element were generated.

7. The method of claim 6, wherein reordering the first set of job openings to generate the second set of job openings further comprises:
identifying a relation among the first hiring entity and the second hiring entity; and
generating a combined weight element from the first weight element and the second weight element based on a relation among the first hiring entity and the second hiring entity.

8. The method of claim 1, wherein the historical hiring model for each company generates a plurality of weight elements, each weight element of the plurality of weight elements corresponding to a characteristic of the set of member characteristics.

9. The method of claim 8, wherein generating the second set of job openings further comprises:
generating a combined characteristic weight element, from the plurality of weight elements, for each company; and
reordering the first set of job openings from a first order to a second order based on the combined characteristic weight elements generated by the historical hiring model for each company being applied to the job opening for which the combined characteristic weight element was generated.

10. The method of claim 1, wherein generating the second set of job openings further comprises:
processing the set of member characteristics using the historical hiring model for each company associated with a job opening of the plurality of job openings and excluded from the first set of job openings.

11. A system, comprising:
one or more modules implemented by one or more processors, the one or more modules configured to:
access a member profile comprising a set of member characteristics for a member of a social networking system;
identify a set of career paths by providing the set of member characteristics as input to a career path model that outputs the set of career paths based on the input;
generate, by at least one processor of a machine, a first set of job openings from a plurality of job openings based on the set of career paths, each job opening of the first set of job openings associated with a company of a set of companies;
generate, by at least one processor of the machine, a second set of job openings from the first set of job openings, the second set of job openings generated by using a plurality of historical hiring models to filter out one or more job openings from the first set of job openings by processing the set of member characteristics using a different historical hiring model for each company associated with a job opening of the first set of job openings, wherein each historical hiring model for each corresponding company is formed by:
use explicit and implicit signals to identify members likely hired by the corresponding company in the past;
mine member data for the identified members likely hired by the corresponding company in the past to identify similarities among the identified members likely hired by the corresponding company;
remove one or more identified similarities from consideration that are driven by explicit needs for the job opening; and
train the historical hiring model using features other than the one or more identified similarities removed from consideration; and
communicate information pertaining to the second set of job openings for presentation to a client device accessing the social networking system.

12. The system of claim 11, wherein the one or more modules are configured to receive a set of search parameters indicative of a request for job openings on the social networking system, from a member of the social networking system.

13. The system of claim 11, wherein the historical hiring model for each company generates a weight element for a job opening of the first set of job openings with which the company is associated and wherein the one or more modules are configured to reorder the first set of job openings from a first order to a second order based on the weight elements generated by the historical hiring model for each company being applied to the job opening for which the weight element was generated.

14. The system of claim 11, wherein the historical hiring model for each company generates a plurality of weight elements, each weight element of the plurality of weight elements corresponding to a characteristic of the set of member characteristics, and wherein the one or more modules are configured to:
generate a combined characteristic weight element, from the plurality of weight elements, for each company; and
reorder the first set of job openings from a first order to a second order based on the combined characteristic weight elements generated by the historical hiring model for each company being applied to the job opening for which the combined characteristic weight element was generated.

15. A non-transitory machine-readable storage medium comprising processor executable instructions that, when executed by a processor of a machine, cause the machine to perform operations comprising:
accessing a member profile comprising a set of member characteristics for a member of a social networking system;
identifying a set of career paths by providing the set of member characteristics as input to a career path model that outputs the set of career paths based on the input;
generating, by at least one processor of a machine, a first set of job openings from a plurality of job openings based on the set of career paths, each job opening of the first set of job openings associated with a company of a set of companies;
generating, by at least one processor of the machine, a second set of job openings from the first set of job openings, the second set of job openings generated by using a plurality of historical hiring models to filter out one or more job openings from the first set of job openings by processing the set of member characteristics using a different historical hiring model for each company associated with a job opening of the first set of job openings, wherein each historical hiring model for each corresponding company is formed by:
- using explicit and implicit signals to identify members likely hired by corresponding company in the past;
- mining member data for the identified members likely hired by the corresponding company in the past to identify similarities among the identified members likely hired by the corresponding company;
- removing one or more identified similarities from consideration that are driven by explicit needs for the job opening; and
- training the historical hiring model using features other than the one or more identified similarities removed from consideration; and communicating information pertaining to the second set of job openings for presentation to a client device accessing the social networking system.

16. The non-transitory machine-readable storage medium of claim 15, wherein the processor executable instructions cause the machine to perform operations comprising:
receiving a set of search parameters indicative of a request for job openings on the social networking system, from a member of the social networking system.

17. The non-transitory machine-readable storage medium of claim 15 wherein the historical hiring model for each company generates a weight element for a job opening of the first set of job openings with which the company is associated and wherein the processor executable instructions cause the machine to perform operations comprising:
reordering the first set of job openings from a first order to a second order based on the weight elements generated by the historical hiring model for each company being applied to the job opening for which the weight element was generated.

18. The non-transitory machine-readable storage medium of claim 15, wherein the historical hiring model for each company generates a plurality of weight elements, each weight element of the plurality of weight elements corresponding to a characteristic of the set of member characteristics.

19. The non-transitory machine-readable storage medium of claim 18, wherein the processor executable instructions cause the machine to perform operations comprising:
generating a combined characteristic weight element, from the plurality of weight elements, for each company; and
reordering the first set of job openings from a first order to a second order based on the combined characteristic weight elements generated by the historical hiring model for each company being applied to the job opening for which the combined characteristic weight element was generated.

20. The non-transitory machine-readable storage medium of claim 15, wherein the processor executable instructions cause the machine to perform operations comprising:
processing the set of member characteristics using the historical hiring model for each company associated with a job opening of the plurality of job openings and excluded from the first set of job openings, wherein the historical hiring model for each company is a Hidden Markov Model (HMM).

* * * * *

UNITED STATES PATENT AND TRADEMARK OFFICE
CERTIFICATE OF CORRECTION

PATENT NO. : 10,387,840 B2
APPLICATION NO. : 14/815788
DATED : August 20, 2019
INVENTOR(S) : Dacheng Zhao It is certified that error appears in the above-identified patent and that said Letters Patent is hereby corrected as shown below:

On the Title Page

Item (57), in "Abstract", in Column 2, Line 6, after "generating", delete "a first"

In the Claims

In Column 23, Line 6, in Claim 15, after "by", insert --the--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*